US010526056B1

(12) United States Patent
Hakki et al.

(10) Patent No.: US 10,526,056 B1
(45) Date of Patent: Jan. 7, 2020

(54) GENERATION OF ELECTRIC POWER USING WAVE MOTION, WIND ENERGY AND SOLAR ENERGY

(71) Applicant: Physician Electronic Networks, L.L.C., Dunedin, FL (US)

(72) Inventors: A-Hamid Hakki, Dunedin, FL (US); Edin Dervishalidovic, Sarajevo (BA); Belmina Hakki, Dunedin, FL (US); Amela Dervishalidovic, Sarajevo (BA)

(73) Assignee: Physician Electronic Network, LLC, Dunedin, FL (US)

( * ) Notice: Subject to any disclaimer, the term of this patent is extended or adjusted under 35 U.S.C. 154(b) by 0 days.

(21) Appl. No.: 16/397,477

(22) Filed: Apr. 29, 2019

(51) Int. Cl.
*B63B 35/44* (2006.01)
*H02S 10/12* (2014.01)
(Continued)

(52) U.S. Cl.
CPC ............. *B63B 35/44* (2013.01); *F03B 13/14* (2013.01); *F03D 1/02* (2013.01); *F03D 1/0675* (2013.01); *F03D 7/0224* (2013.01); *F03D 9/007* (2013.01); *F03D 9/008* (2013.01); *F03D 9/25* (2016.05); *F24S 60/00* (2018.05); *H02K 7/183* (2013.01); *H02N 2/185* (2013.01); *H02S 10/12* (2014.12); *H02S 40/44* (2014.12); *B63B 2035/446* (2013.01); *B63B 2035/4453* (2013.01); *B63B 2035/4466* (2013.01); *F05B 2220/706* (2013.01); *F05B 2220/709* (2013.01); *F05B 2240/95* (2013.01); *F05B 2260/70* (2013.01); *F05B 2270/321* (2013.01)

(58) Field of Classification Search
CPC ............ B63B 35/44; B63B 2035/4453; B63B 2035/446; B63B 2035/4466; H02S 10/12; H02S 40/44; F03D 9/25; F03D 1/02; F03D 1/0675; F03D 7/0224; F03D 9/007; F03D 9/008; F24S 60/00; F03B 13/14; H02K 7/183; H02N 2/185; F05B 2220/706; F05B 2220/709; F05B 2240/95; F05B 2260/70; F05B 2270/321
See application file for complete search history.

(56) References Cited

U.S. PATENT DOCUMENTS 3,668,412 A * 6/1972 Vrana ................... F03B 13/262
290/53
3,708,811 A * 1/1973 Flory .................... B63B 22/021
441/5
(Continued)

*Primary Examiner* — Tulsidas C Patel
*Assistant Examiner* — Joseph Ortega
(74) *Attorney, Agent, or Firm* — Larson & Larson, P.A.; Frank Liebenow; Justin P. Miller

(57) ABSTRACT

A method and apparatus for producing electricity from a combination of three sources: ocean waves, wind and solar, includes converting an upward and downward motion of a buoyant platform into a rotational motion of a shaft using a plurality of blades mounted to the shaft, the blades causing the shaft to rotate from internal wind energy as the blades move up and down within a cavity. The shaft is coupled to a generator for producing electricity. A wind turbine is mounted to the buoyant platform for converting wind energy into electricity. Further, solar panels are included, for example, mounted to the buoyant platform and/or turbine blades of the wind turbine, the solar panels also generate electricity when exposed to light.

18 Claims, 7 Drawing Sheets

(51) Int. Cl.
*H02S 40/44* (2014.01)
*F03D 9/25* (2016.01)
*F24S 60/00* (2018.01)
*F03B 13/14* (2006.01)
*F03D 1/02* (2006.01)
*F03D 1/06* (2006.01)
*F03D 7/02* (2006.01)
*F03D 9/00* (2016.01)
*H02K 7/18* (2006.01)
*H02N 2/18* (2006.01)

(56) References Cited

U.S. PATENT DOCUMENTS

| | | | | |
|---|---|---|---|---|
| 3,889,307 A * | 6/1975 | Houot | | B63B 22/06 441/25 |
| 3,902,553 A * | 9/1975 | Jergins | | E21B 7/132 166/352 |
| 3,922,739 A * | 12/1975 | Babintsev | | B63B 51/02 441/16 |
| 3,965,364 A * | 6/1976 | Gustafson | | F03B 13/183 290/53 |
| 3,968,954 A * | 7/1976 | Casco | | B63B 21/16 254/332 |
| RE29,478 E * | 11/1977 | Goren | | B63B 35/4413 114/265 |
| 4,268,191 A * | 5/1981 | Tuson | | B63B 35/4406 405/173 |
| 4,352,023 A * | 9/1982 | Sachs | | F03B 13/20 290/42 |
| 4,355,511 A * | 10/1982 | Jones | | F03B 13/1845 290/42 |
| 4,685,296 A | 8/1987 | Burns | | |
| 4,768,984 A * | 9/1988 | de Oliveira | | B63B 35/4406 441/21 |
| 4,851,704 A | 7/1989 | Rubi | | |
| 5,136,173 A | 8/1992 | Rynne | | |
| 5,549,445 A * | 8/1996 | Schremp | | F03B 13/183 415/2.1 |
| 5,770,893 A * | 6/1998 | Youlton | | F03B 13/142 290/42 |
| 5,782,663 A * | 7/1998 | Van Raden | | B63B 22/18 441/25 |
| 6,113,314 A * | 9/2000 | Campbell | | B63B 21/502 166/339 |
| 6,160,336 A * | 12/2000 | Baker, Jr. | | G21K 1/00 290/55 |
| 6,731,018 B1 * | 5/2004 | Grinsted | | F03B 17/06 290/42 |
| 6,768,216 B1 * | 7/2004 | Carroll | | F03B 13/148 290/42 |
| 6,825,574 B1 * | 11/2004 | Mooring | | F03D 1/00 290/1 R |
| 6,864,592 B1 | 3/2005 | Kelly | | |
| 6,953,328 B2 * | 10/2005 | Welch, Jr. | | F04B 35/004 417/331 |
| 7,453,165 B2 | 11/2008 | Hench | | |
| 7,520,237 B1 * | 4/2009 | Dimov Zhekov | | B63B 39/10 114/264 |
| 7,525,213 B2 * | 4/2009 | Nagata | | F03B 13/142 290/53 |
| 7,808,120 B2 * | 10/2010 | Smith | | F03B 13/1815 290/42 |
| 8,129,854 B2 | 3/2012 | Patten | | |
| 8,878,381 B2 * | 11/2014 | Henry | | F03B 13/264 290/53 |
| 8,925,313 B2 * | 1/2015 | Moffat | | F03B 13/22 60/497 |
| 8,955,315 B2 * | 2/2015 | Yen | | F03B 13/264 415/58.5 |
| 9,074,577 B2 | 7/2015 | Dehlsen | | |
| 9,243,612 B2 * | 1/2016 | Carretero Bueno | | F03D 3/005 |
| 9,500,176 B2 * | 11/2016 | Moffat | | F03B 13/22 |
| 10,087,915 B1 * | 10/2018 | Srinivasan | | F03D 13/25 |
| 10,280,894 B1 * | 5/2019 | Bender | | F03B 13/1845 |
| 2003/0145587 A1 * | 8/2003 | Christensen | | F03B 13/147 60/398 |
| 2003/0155774 A1 * | 8/2003 | Chalmers | | F03B 13/148 290/53 |
| 2003/0168864 A1 * | 9/2003 | Heronemus | | B63B 1/047 290/55 |
| 2003/0202889 A1 * | 10/2003 | Myers | | F04B 17/02 417/334 |
| 2004/0031265 A1 * | 2/2004 | Doleh | | F03B 13/147 60/398 |
| 2004/0141851 A1 * | 7/2004 | Hite | | F03D 9/00 417/61 |
| 2005/0167988 A1 * | 8/2005 | Wood | | F03B 13/187 290/53 |
| 2006/0242954 A1 * | 11/2006 | Welch, Jr. | | F03B 13/1875 60/398 |
| 2007/0243063 A1 * | 10/2007 | Schellstede | | E02D 27/42 416/10 |
| 2008/0088133 A1 * | 4/2008 | Nagata | | F03B 13/142 290/53 |
| 2009/0021012 A1 * | 1/2009 | Stull | | F03D 9/28 290/44 |
| 2009/0121486 A1 * | 5/2009 | Ganley | | F03B 13/262 290/53 |
| 2009/0309366 A1 * | 12/2009 | Moore | | B63B 35/44 290/53 |
| 2010/0078942 A1 * | 4/2010 | Bois | | F03D 9/00 290/54 |
| 2010/0230965 A1 * | 9/2010 | Pitre | | F03B 13/186 290/42 |
| 2010/0320765 A1 * | 12/2010 | Folchert | | F03B 13/142 290/53 |
| 2011/0012368 A1 * | 1/2011 | Hahmann | | F03B 13/187 290/1 C |
| 2011/0037264 A1 * | 2/2011 | Roddier | | B63B 35/44 290/44 |
| 2011/0061376 A1 * | 3/2011 | McAlister | | C25B 15/00 60/498 |
| 2011/0200425 A1 * | 8/2011 | Weaver | | B63B 35/44 415/7 |
| 2012/0045345 A1 * | 2/2012 | Horton, III | | E04H 12/10 416/244 R |
| 2012/0183359 A1 * | 7/2012 | Nordstrom | | B63B 35/003 405/205 |
| 2012/0187693 A1 * | 7/2012 | Houvener | | F03B 17/061 290/54 |
| 2012/0280505 A1 * | 11/2012 | Thomas | | F03B 13/186 290/53 |
| 2013/0008157 A1 * | 1/2013 | Zuo | | F03B 13/18 60/497 |
| 2013/0134714 A1 * | 5/2013 | Daqian | | F03B 13/262 290/53 |
| 2014/0026798 A1 * | 1/2014 | Yoshimoto | | B63B 35/44 114/264 |
| 2014/0145444 A1 * | 5/2014 | Park | | F03B 13/1845 290/53 |
| 2014/0248091 A1 * | 9/2014 | Johnson, Jr. | | B63B 21/26 405/205 |
| 2015/0104259 A1 * | 4/2015 | Johnson | | B63B 21/26 405/205 |
| 2015/0194813 A1 * | 7/2015 | Finn | | H05K 7/1497 307/19 |
| 2015/0211477 A1 * | 7/2015 | Wright | | F03B 13/14 290/53 |
| 2015/0316022 A1 * | 11/2015 | Zhang | | F03B 17/02 60/495 |
| 2015/0322914 A1 * | 11/2015 | Zuo | | F03B 13/18 60/497 |
| 2015/0361965 A1 * | 12/2015 | Jimeno Chueca | | F03D 13/40 405/200 |
| 2016/0025064 A1 * | 1/2016 | Hashimoto | | F03B 9/32 29/593 |

(56) References Cited

U.S. PATENT DOCUMENTS

| | | | |
|---|---|---|---|
| 2016/0169188 A1* | 6/2016 | Dick | F03B 13/24 |
| | | | 290/53 |
| 2016/0265506 A1* | 9/2016 | Kimura | F03B 13/1845 |
| 2017/0194837 A1* | 7/2017 | Sichau | H02S 30/20 |
| 2017/0201155 A1* | 7/2017 | Nishiura | F03D 9/25 |
| 2017/0363058 A1* | 12/2017 | Etherington | F03B 13/20 |
| 2018/0022426 A1* | 1/2018 | Siegmann | B63B 35/44 |
| | | | 114/264 |
| 2018/0030953 A1* | 2/2018 | Stapelmann | F03B 13/189 |
| 2018/0030958 A1* | 2/2018 | Sant | F03B 13/06 |
| 2018/0058420 A1* | 3/2018 | Moffat | F03B 11/02 |
| 2018/0128245 A1* | 5/2018 | Brown | F03D 9/007 |
| 2018/0148140 A1* | 5/2018 | Fernandez Gomez | |
| | | | F03D 13/10 |
| 2018/0238294 A1* | 8/2018 | Alm | F03B 13/20 |
| 2019/0151798 A1* | 5/2019 | Lafortune | B01D 61/025 |
| 2019/0152568 A1* | 5/2019 | Lim | B63B 5/20 |
| 2019/0202530 A1* | 7/2019 | Rikoski | B63B 9/06 |
| 2019/0308709 A1* | 10/2019 | Kramer | B63H 25/44 |

\* cited by examiner

GENERATION OF ELECTRIC POWER USING WAVE MOTION, WIND ENERGY AND SOLAR ENERGY

FIELD

This invention relates to the field of power generation and more particularly to a system for generating electrical energy from three sources: using motion derived from waves, wind, and the sun.

BACKGROUND

From the dawn of time, humans used renewable energy sources such as the sun, wind and the seas. People in ancient Persia and the Middle East around 500-900 AD used vertical-axis windmills to mill grain and pump water. Today, the rise of environmental pollution has posed major health hazards to our planet's population and has caused a negative impact on global economy. Many industrialized nations have acted to tap renewable energy sources such as wind energy. In 2014, China had a substantial wind generation capacity of 114,763 Megawatts. In the United States, Texas produced 36 million megawatt hours (MWh) of electricity in 2014.

Wind turbines comprise 2-3 huge propeller-like blades that turn a rotor that is linked to a generator to produce electricity, thus converting wind to electrical power. Current wind turbines have blades that rotate 10-20 revolutions per minute, which translates to a speed of 120 to 180 mph at the tips of the blades with wind speeds of 13 to 15 mph or more. Wind speeds of 9 mph (4 meters/second) are generally needed to turn the blades of a wind turbine. The blades or vanes rotate clockwise as seen from the front and are often controlled by a microprocessor that evaluates the speed and direction of the wind. The blades or vanes are aerodynamic to efficiently convert the wind force to rotational energy and eventually electric energy. The blades are connected to a gearbox or directly to the generator converting mechanical rotation to electrical energy.

The limitations of the majority of conventional wind turbines is that the blades rotate in only one direction, they utilize one set of blades per tower, and they only rotate in vertical orientation. Winds are not always 100% horizontal or 100% easterly or westerly relative to the location of the wind turbine. Current technology lacks wind turbine with more than one set of blades, lack blades that rotate in opposite directions, (e.g. clockwise and counterclockwise in the same tower using different sets of blades), and lack blades that tilt an angle to vertical depending on wind directions.

Natural energy is also harnessed using solar panels. Conventional solar panels are two dimensional (flat) structures typically having a frame typically made of anodized aluminum, a cover of protective tempered antiglare glass, layers of ethylene vinyl acetate binding all the components and protecting the solar cells, the solar cells themselves, an electrically neutral back sheet, and a junction box for transferring electricity from a solar array via connectors and wires.

Conventional solar panels are typically two dimensional flat structures. This flat surface provides only a single focal point of light from the sun on only one cell, if all the panels are at the same level and angle. No prior art discloses a three dimensional structure (ignoring minor panel thickness) to capture solar energy by providing larger surface area for the same base area.

Ocean waves are multi-directional pulsating forces that vary in size and periodicity. An ideal system would extract ocean wave energy at low cost with limited negative impact on marine life, navigation and beaches.

Existing systems include a floating platform that use piston(s) to compress water in serial cylinders resulting in rotation of a flywheel attached to an electric generator. This system captures surface motion but not a deeper massive displacement of ocean water with rising waves.

Also known is a buoy that tilts with wave motion causing a pendulum to rotate around a central shaft converting kinetic energy to electricity.

Some have used floats that are attached to lever arms to compress hydraulic fluid driving an electric generator or convert linear force to rotational force against a submerged platform by mechanical or hydraulic means.

No existing technology utilizes ocean wave motion to generate wind energy and convert the wind energy to electrical energy using wind-driven rotation of wind turbine blades within a piston anchored to the ocean floor.

To date, ocean deployment of electrical generation systems has been limited to either harnessing of wind power or harnessing of wave motion, but not both. Considering the expense of deploying such large and complicated structures so as to withstand the forces of nature, the more energy that is derived from each ocean deployment, the more efficient, and therefore, cost effective is the overall installation.

What is needed is a system that will harness wind power, power from wave motion and solar energy in a common platform.

SUMMARY

In one embodiment, a system for generating electric power from a platform located in a body of water is disclosed including a base mounted into a floor of the body of water and an outer structure rising from the base and forming a cavity. A buoyant platform that moves upward and downward with respect to the base as a result of waves and tides in the body of water is interfaced to a shaft within the cavity. The shaft has blades attached thereto and the shaft is coupled to a generator of electricity. There is a device for converting the upward movement and the downward movement into internal wind such as a piston or piston-like structure within the cavity. As the blades are exposed to the internal wind, the blades rotate the shaft and the shaft runs the generator to output electricity. A wind turbine is installed atop the buoyant platform; the wind turbine has turbine blades that turn a second shaft responsive to ambient wind. The second shaft is coupled to a second generator of electricity such that, as the turbine blades turn the second shaft, the second generator generates electricity. There is also a plurality of two dimensional and/or three dimensional solar panels mounted to the buoyant platform and/or the turbine blades. The plurality of solar panels generates electricity upon exposure to light radiation.

In another embodiment, a method of producing electricity in a common platform mounted to a floor of a body of water is disclosed including providing a buoyant platform for converting an upward and downward motion of the buoyant platform into a rotational motion using a plurality of blades, the blades causing the rotational motion as the blades meet air flow caused by up and down motion of the buoyant platform and the rotational motion turning a generator, thereby producing electricity. A wind turbine is also coupled to the buoyant platform for converting ambient wind energy into electricity. In addition, one or more two dimensional and/or three dimensional solar panels are mounted to the common platform and/or blades of the wind turbine. The solar panels convert light energy into the electricity when present.

In another embodiment, an apparatus for generating electric power from a platform located in a body of water is disclosed including a base mounted into a floor of the body of water having a stationary structure rising therefrom. The stationary structure has a cavity. A piston is configured to move up and down within the cavity. A buoyant platform is coupled to the piston; as the buoyant platform moves upward and downward with respect to the stationary structure responsive to wave motion in the body of water, the buoyant platform moves the piston within the cavity as the buoyant platform moves up and down. A shaft having blades attached thereto is interfaced with the piston, such that energy of a moving air or gas within the piston (e.g. internal wind) is directed upon the blades to cause rotation of the blades and, hence, rotation of the shaft. The shaft turns an electric generator and the electrical generator converts rotation of the shaft into electricity. The apparatus includes an above water wind turbine mounted on the buoyant platform. The wind turbine has turbine blades that are configured to turn a first turbine shaft in a first rotational direction responsive to ambient wind, the first turbine shaft is coupled to a second generator of electricity such that, as the turbine blades turn, so does the first turbine shaft and the second generator generates electricity. There is also a plurality of two dimensional and three dimensional solar panels mounted to the buoyant platform and/or the turbine blades. The plurality of solar panels generate electricity upon exposure to light radiation.

An electricity generating system is proposed that combines a wind turbine, three dimensional solar photovoltaic cells and pistons moving vertically with ocean waves. A wind turbine with one or more rows of independently rotating tilting blades that rotate by wind direction and are covered by solar photovoltaic cells (two dimensional and/or three dimensional configuration), is secured to a flatbed on top of a hydrodynamic float that moves in a vertical direction by ocean waves. The float is attached to a cylindrical watertight piston that is secured to the ocean floor and by vertical motion of ocean waves compresses and decompresses air causing bidirectional rotation of blades around a vertical rotor within the pistons that converts motion to electricity. Magnets are used to generate electricity from piston motion.

The solar cells on the wind turbine blades are arranged in a three-dimensional hemi-cylindrical configuration to maximize exposure to the sun by increasing the surface area of photo electric cells and house heating pressurized chambers within the hemi-cylinders. The windmill blades may be angled between 0 and 360 degrees in relation to the vertical axis to maximize alignment with wind direction. The combined harvesting of wind, solar and ocean energy in one structure provides efficient and clean energy at a lower cost compared to conventional wind turbines, solar panels and ocean waves energy systems.

In some embodiments, a floating hydrodynamic structure has a rotor attached to the interior surface of a submerged dome that moves in a vertical direction with ocean waves. The rotor is attached at its lower end to an inner piston that compresses air in a chamber within an outer piston. The top and bottom of the inner piston has adjustable apertures through which compressed air/gases have to pass through in order to provide the right velocity of air that rotates a series of fan blades or rotors within the inner piston. The fan blades or rotors rotate in a horizontal direction, some clockwise and others counterclockwise in order to capture air flow upwards and downwards. The fan speed can be altered by changing the dimensions of the apertures of the inner piston using rotatable discs with overlapping apertures. The inner and outer pistons are kept water free by a barrier wall that extends from the ocean floor to near the bottom of the floating structure. The barrier wall is made of material that withstands high ocean pressure near the ocean floor and is connected to at least one accordion shaped structure close to the ocean surface where the pressure is lower. The accordion structures expand and shrink with vertical movements of the buoyant vessel, so as not to interfere with the piston motion.

In some embodiments, a buoyant hydrodynamic structure or vessel attached to a cylindrical piston that floats on ocean waves with the base of the cylinder anchored to the ocean floor. The piston compresses air to activate internal blades that rotate in a bidirectional way. The floating vessel also provides a base for a wind turbine that has blades or vanes covered with two dimensional or three dimensional solar panels to harness solar energy simultaneously with wind.

In some embodiments, wind turbines are disclosed with more than one set of blades, blades that rotate in opposite directions, (e.g. clockwise and counterclockwise in the same tower using different sets of blades), and blades that tilt an angle to vertical depending on wind directions. Further, in order to harness more natural energy, in some embodiments, the wind turbine blades or vanes are lined with solar photovoltaic (PV) cells to collect solar energy by converting light into electricity. It is anticipated that an inverter or a micro-inverter then converts direct current electricity from the photovoltaic cells to alternating current. Rain and wind help keep the blades clean by washing away dirt and dust particles.

In another embodiment, an arrangement of solar cells is disclosed. Instead of two-dimensional solar cells (ignoring minimal thickness), each solar cell is a three-dimensional structure such as a hemisphere or a hemi-cylinder. In addition, by configuring the PV cell in a hemi-cylinder shape the surface area of PV cells exposed to direct and indirect sunlight increases by a factor of 1.57 (½ of 22/7). The surface area of 20 cm by 20 cm square, two-dimensional solar panel is 400 cm2, while a hemicylinder within the same square foot base having a radius of 10 cm has a surface area of 628.57 cm2, or more than 1.5 times the surface area of the two dimensional rectangular solar cell. Similarly, the surface area of a two-dimensional 20 cm by 1000 cm panel is 20,000 cm2, while a hemi-cylinder having a base with the same dimensions will have a surface area of 31,730 cm2, or 1.5 time the two-dimensional surface, a factor of ½ of 22/7, or 1.57 plus 314.29 cm2 (the area of the two semi circles at each end of the hemi-cylinder exposed to sun light). Moreover, in some embodiments, the air underneath the hemisphere or the hemi-cylinder is utilized to generate electricity by converting heat within the airtight enclosed space to electricity as the air flows to the colder electrically neutral back sheet. In some embodiments, piezoelectric crystals line the inside of the three dimensional structure are placed to add more electricity by converting pressure differential of the expanding (heated) air in a sealed space into electric current.

In some embodiments, ocean wave motion is used to generate underwater wind energy and the wind energy is subsequently converted into electrical energy using vertical axis rotations of wind turbine blades within a piston anchored to the ocean floor.

In some embodiments, a floating hydrodynamic structure has a rotor attached to the inferior surface of a submerged dome that moves in a vertical direction with ocean waves. The rotor is attached at its lower end to an inner piston that compresses air in chambers within an outer piston. The top and bottom of the inner piston has adjustable apertures through which compressed air passes in order to provide the right velocity of air to rotate a series of blades (e.g. fan blades) within the inner piston. The fan blades rotate, some clockwise and others counterclockwise, in order to capture air flow upwards and downwards. The blade speed is determined by changing the dimensions of the apertures of the inner piston using 2 discs with overlapping apertures. The cylinder inner and outer pistons are kept water free by a barrier wall that extends from the ocean floor to near the bottom of the floating structure, but more than the maximum ocean wave displacements. The barrier wall is made of material that withstands high ocean pressure near the ocean floor is connected to at least one accordion shaped structure close to the ocean surface where the atmospheric pressure is lower. The accordion structures expand and shrink with vertical movements of the buoyant vessel, so as not to interfere with the piston motion, meanwhile keeping the pistons free of water.

In one embodiment, a system for generating electric power from a platform located in a body of water is disclosed including a base mounted into a floor of the body of water having an outer structure that rises from the base. The outer structure forms a cavity internally. A support beam rises from the base within the cavity. A movable outer support is slideably interfaced to the support beam and configured to slide up and down with respect to the support beam and the base. An electric generator is interfaced to the movable outer support to convert rotational energy of the movable outer support into electrical energy. A buoyant platform is connected to the movable outer support, the buoyant platform moves upward and downward with respect to the support beam and to the base, thereby the movable outer support moves up and down as the buoyant platform moves up and down as a result of waves and tides in the body of water. A plurality of blades (e.g. fan blades, turbine blades) are interfaced to the movable outer support, thereby the plurality of blades move with the movable outer support and air flow caused by movement of the blades within the cavity invokes rotation of the movable outer support, and hence, the electric generator generates the electrical energy.

In another embodiment, a method of producing electricity is disclosed including converting an upward and downward motion of a buoyant platform into a rotational motion using a plurality of blades, the blades causing a rotational motion as the blades move up and down within a cavity. A generator uses the rotational motion for producing the electricity.

In another embodiment, an apparatus for for generating electric power from a platform located in a body of water is disclosed including a base mounted into a floor of the body of water and an outer structure that rises from the base forming a cavity. A support shaft rises from the base and a movable outer shaft is slideably interfaced to the support shaft. The movable outer shaft is configured to slide up and down with respect to the support shaft and the base. An electric generator is interfaced to the movable outer shaft to convert rotational energy of the movable outer shaft into electrical energy. A buoyant platform is connected to the movable outer shaft and moves upward and downward with respect to the support beam and to the base responsive to wave motion in the body of water, thereby the buoyant platform moves the movable outer shaft up and down as the buoyant platform moves up and down. A plurality of fan blades are interfaced to the movable outer shaft, thereby the plurality of fan blades move with the movable outer shaft within the cavity and air flow caused by movement of the fan blades within the cavity invokes rotation of the movable outer shaft, and hence, the electric generator generates the electrical energy.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
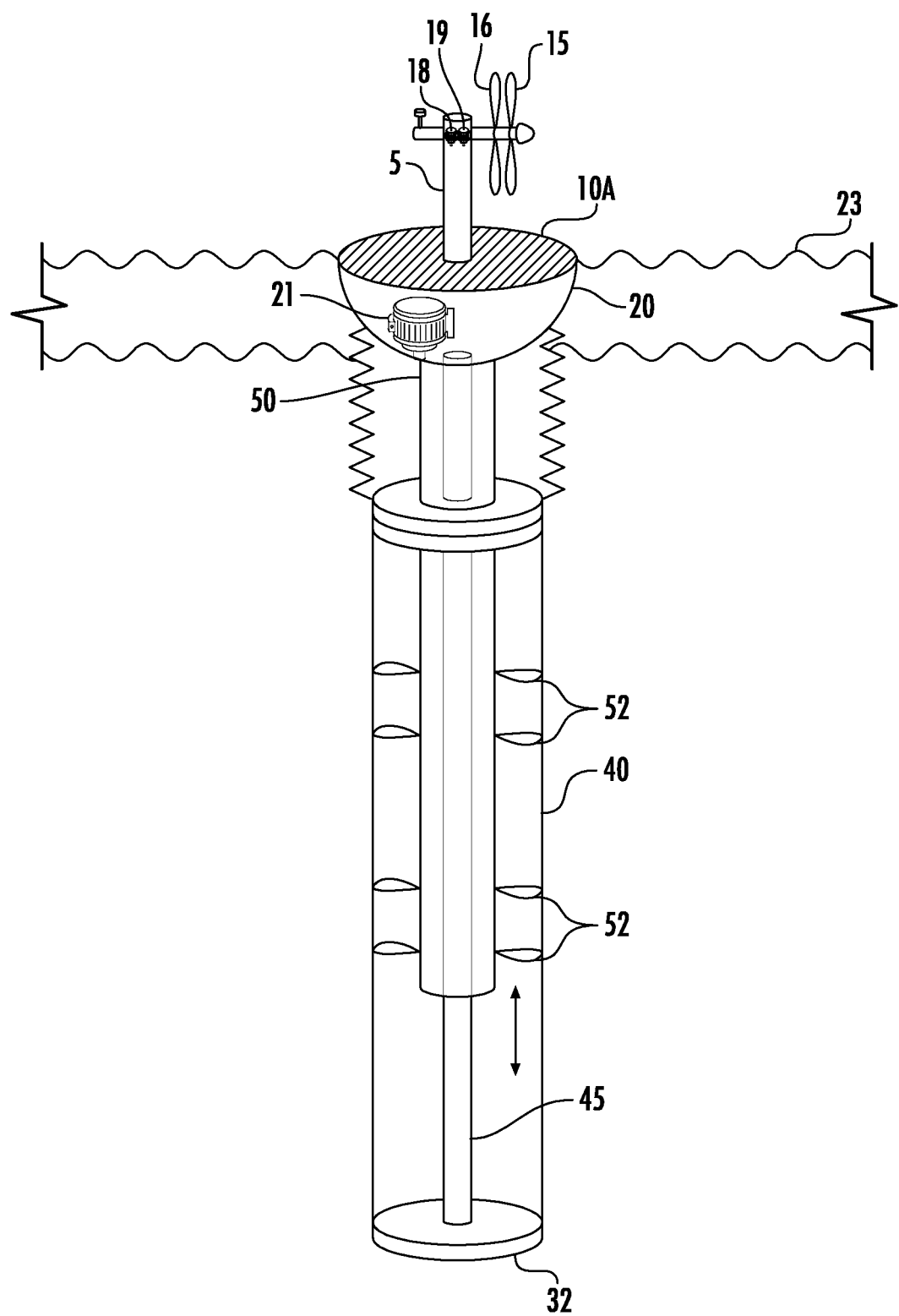
FIG. 1 illustrates a view of a system for generation of power from wind and wave energy.

Reference will now be made in detail to the presently preferred embodiments of the invention, examples of which are illustrated in the accompanying drawings. Throughout the following detailed description, the same reference numerals refer to the same elements in all figures.

Wind turbines used to capture wind and convert the wind energy into useful electrical energy has been known for many years. The cost of construction and deployment of such systems, especially when located on a body of water, is very high. Being that this cost is so high, the initial capital outlay often discourages construction and deployment as the time-to-breakeven is often long, though after that time, future income streams are usually lucrative. In order to shorten in the time-to-breakeven, the present application provides an enhanced system that includes capturing and conversion of wind energy while also capturing solar energy and/or wave energy, thereby utilizing the same platform with minimal additional expenses, thereby improving cash flow and reducing the time-to-breakeven.

Referring to FIG. 1, a common platform for generation of combined power from wind, solar, and wave energy is shown. The system for generation of power from wind and wave energy has a buoyant platform 20 that floats upon the surface 23 of a body of water (e.g. an ocean or lake). A wind turbine tower 5 is mounted atop the buoyant platform 20 to harness energy from ambient wind. A position of the buoyant platform 20 is maintained by a stationary structure that has a base 32 that is footed on the floor of the body of water (e.g. sunk into the ocean floor). A vertical axle 50 (e.g., a shaft, axle, or other similar structure) depends from the buoyant platform 20 (e.g., hydrodynamic float) and is movably coupled to the base 32, allowing for rotation of the vertical axle 50 while the buoyant platform 20 is allowed to move up and down caused by wave motion. The upward and downward motion of the buoyant platform 20 moves the vertical axle 50 (e.g. a movable shaft, movable axle, or movable beam) up/down on an inner post 45 (e.g., a shaft of support beam). As the vertical axle 50 moves up and down, blades 52 (e.g. fan blades) are presented with internal air flow (e.g. internal wind or moving fluid) as they also move up and down within a cavity formed by the outer structure 40 as the air within the outer structure is generally stable within the outer structure 40. Rotation of the vertical axle 50 is coupled to one or more electric generators 21 for the production of electricity (transmission of the electricity out of the system for generation of power from wind, solar, and wave energy is not shown for clarity reasons).

The outer structure 40 is anchored to the ocean floor at its base 32. In the example of FIG. 1, the outer cylinder is kept watertight by at least one accordion shaped structure 31 that shrinks and expands with vertical motion of the buoyant platform 20, while providing little resistance to piston motion and at the same time providing a water seal for the inner and outer pistons. In some embodiments, the accordion shaped structure 31 also limits excessive downward movement of the buoyant platform 20.

The fan blades 51/52 within the outer structure 40 rotate around a vertical axle 50 that interfaces to one or more electric generators 21 where the rotation is converted to electricity.

In some embodiments, magnets are attached to the vertical axle 50 and/or the outer structure 40 and interface to coils of wire that are attached to the vertical axle 50 and/or the outer structure 40 to provide for generation of additional electricity.

The wind turbine tower 5 supports one or more sets of wind turbine blades 15/16 that rotate independent of each other on a common axis due to ambient wind; and cause rotation of the one or more electric generators 18/19 that convert rotational energy to electricity.

In some embodiments, an angle and direction of the wind turbine blades 15/16 is adjustable (see FIG. 4), automatically adjusting both the direction and angle of the wind turbine blades 15/16 to maximize conversion of ambient wind into rotational energy, and consequently electric energy.

In some embodiments, the wind turbine blades 15/16 are covered with a layer of solar cells 10. Likewise, in some embodiments, the buoyant platform 20 also has solar cells 10A mounted there upon. The solar cells 10/10A collect solar energy and convert the solar energy into electricity. In some embodiments, the solar cells 10/10A are constructed in the three-dimensional shape of a hemi-cylinder solar cells 69 in order to increase the area exposed to sunrays (see FIGS. 5 and 6 and summarized in Table 1 below). Therefore, in some embodiments of the present invention, energy is captured from the ambient wind by the wind turbine blades 15/16, from the sun by the solar cells 10/10A, by air flow that is converted into rotation of a generator by the blades 52, the underwater air flow caused by wave motion lifting/dropping the buoyant platform 20.

TABLE 1

Comparison of solar cells

| Configuration/arrangement | two dimensional | hemi-cylinder |
|---|---|---|
| Airtight compartment | No | Yes |
| Heat collection for gen. electricity | No | Yes |
| Compressed air to electricity | No | Yes |
| Piezoelectric crystal for electricity | No | Yes |
| Area exposed to sun photons | ×1 | ×1.5 |

Figure 2:
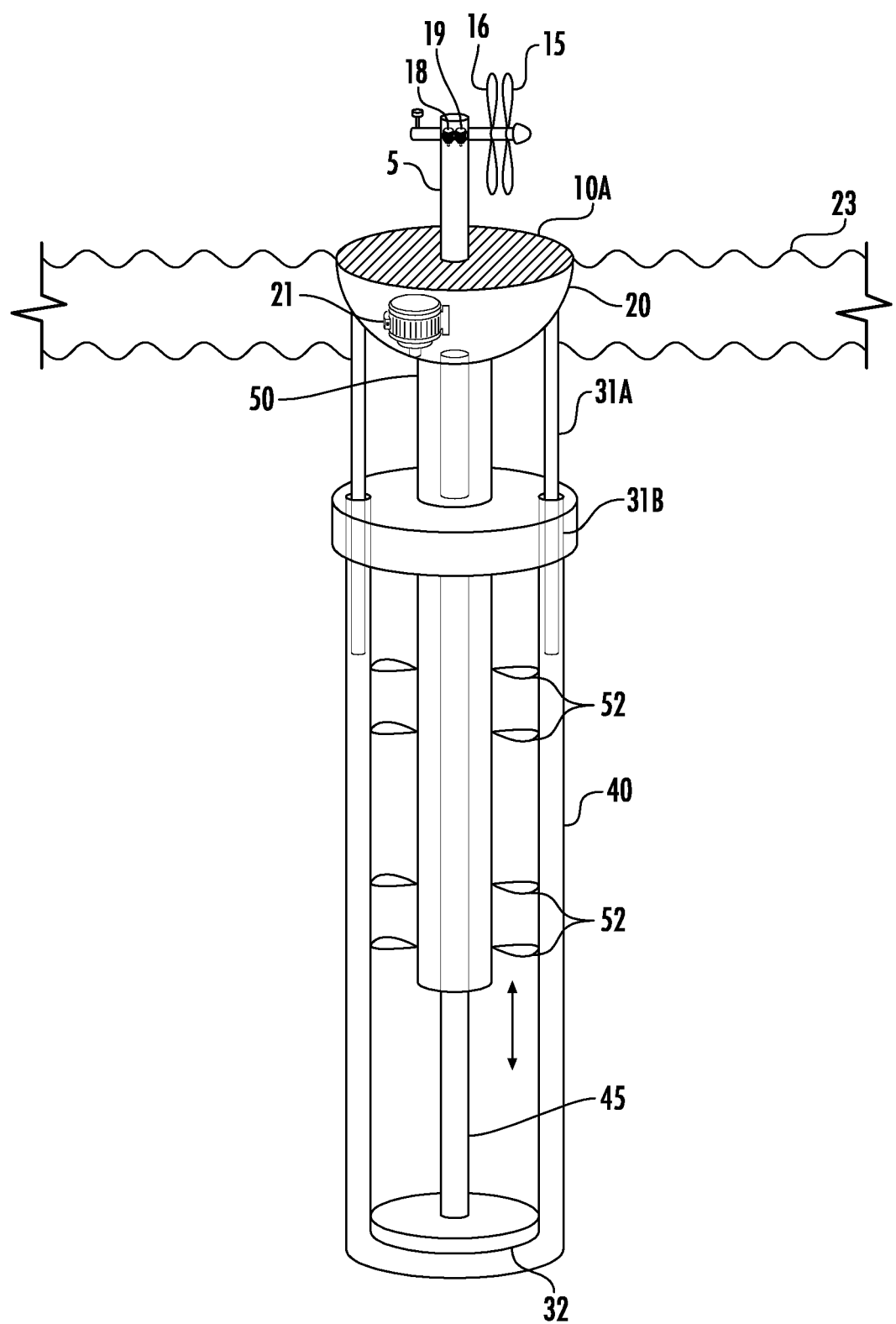
FIG. 2 illustrates a view of an alternate system for generation of power from wind and wave energy.

Referring to FIG. 2, an alternate system for generation of power from wind, solar, and wave energy is shown. The alternate system for generation of power from wind, solar, and wave energy has a buoyant platform 20 that floats upon the surface 23 of a body of water (e.g. an ocean or lake). A wind turbine tower 5 is mounted atop the buoyant platform 20 to harness energy from ambient wind. The position of the buoyant platform 20 is maintained by a base 32 that is footed on the floor of the body of water (e.g. sunk into the ocean floor). A vertical axle 50 depends from the buoyant platform 20 and is movably coupled to the base 32, allowing for rotation of the vertical axle 50 while the buoyant platform 20 is allowed to move up and down caused by wave motion. The upward and downward motion of the buoyant platform 20 moves the vertical axle 50 up/down on an inner post 45 within the outer structure 40. In some embodiments, for added structural strength, the buoyant platform 20 is further supported by telescoping posts 31A that telescope into and out of receptors 31B in the outer structure 40. As the vertical axle 50 moves up/down, fluid within the vertical axle 50 is displaced.

As the vertical axle 50 moves up and down, blades 52 are presented with internal air flow as they also move up and down within the outer structure 40 as the air within the outer structure is generally stable within the outer structure 40. Rotation of the vertical axle 50 is coupled to one or more electric generators 21 for the production of electricity (transmission of the electricity out of the system for generation of power from wind and wave energy is not shown for clarity reasons).

The outer structure 40 is anchored to the ocean floor at its base 32. The blades 52 within the outer structure 40 rotate around a vertical axle 50 that interfaces to one or more electric generators 21 where the rotation is converted to electricity.

In some embodiments, magnets are also attached to the vertical axle 50 and/or the outer structure 40 and interface to coils of wire that are attached to the vertical axle 50 and/or the outer structure 40 provide for generation of additional electricity.

The wind turbine tower 5 supports one or more sets of wind turbine blades 15/16 that rotate independent of each other. In some embodiments, a first set of the wind turbine blades 15 rotate in a first rotational direction and a second set of the wind turbine blades rotate in a second rotational direction, opposite to the first rotational direction. The rotation of the sets of wind turbine blades 15/16 cause rotation of the one or more electric generators 18/19 that convert rotational energy into electricity.

In some embodiments, an angle (with respect to the horizon) as well as a direction (compass direction) of the wind turbine blades 15/16 is adjustable (see FIG. 4), automatically adjusting both the direction and angle of the wind turbine blades 15/16 to maximize conversion of wind into rotational energy, and consequently electric energy.

In some embodiments, the wind turbine blades 15/16 are covered with a layer of solar cells 10. Likewise, in some embodiments, the buoyant platform 20 also has solar cells 10A mounted there upon. The solar cells 10/10A collect solar energy and convert the solar energy into electricity. In some embodiments, the solar cells 10/10A are constructed in the shape of a three-dimensional hemi-cylinder solar cell 69 in order to increase the area exposed to sunrays (see FIGS. 5 and 6 and summarized in Table 1 above). Therefore, in some embodiments of the present invention, energy is captured from the wind by the wind turbine blades 15/16, from the sun by the solar cells 10/10A, by underwater air flow that is converted into rotation of a generator by the blades 52, the air flow caused by wave motion lifting/dropping the buoyant platform 20.

Figure 3:
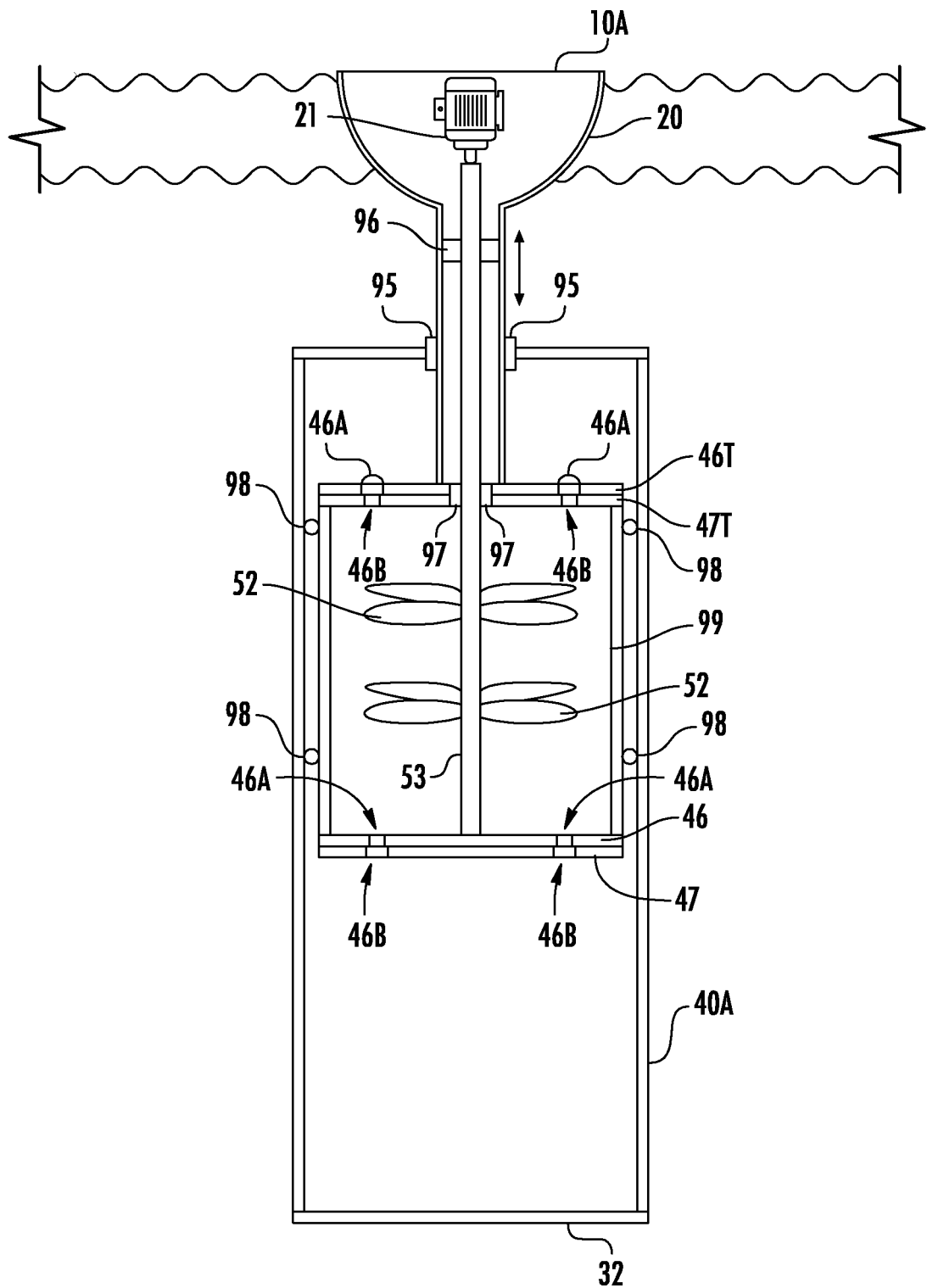
FIG. 3 illustrates a view of an alternate system for generation of power from wave energy.

Referring now to FIG. 3, a view of an alternate system for generation of power from wave, solar, and wind energy is shown. Note that the wind and solar energy harvesting portions are not shown in FIG. 3 for brevity and clarity. Refer to FIGS. 1 and 2 for details of such.

In FIG. 3, the buoyant platform 20 is interfaced to a piston 99. As the buoyant platform 20 moves vertically (up and down) caused by, for example, wave motion, the up/down motion moves the piston 99 up/down within a cylinder 40A (e.g., the outer structure 40). In some embodiments, air flow around the outer walls of the piston 99 is reduced by one or more seals 98.

As the piston 99 moves downward within the cylinder 40A, a gas (e.g. air) from below the piston 99 flows into the piston 99, flowing through orifices 46A/46B in adjustment discs 46/47, and into the piston 99. The gas flows through the piston 99, then out orifices 46B/46A in another set of adjustment discs 46T/47T. This flow of the gas exerts air pressure against blades 52, causing a shaft 53 to turn. Shaft 53 is coupled to an electric generator 21 for producing electricity from the rotation of the shaft 53.

As the piston 99 moves upward within the cylinder 40A, the gas (e.g. air) from above the piston 99 flows into the piston 99, flowing through orifices 46A/46B in adjustment discs 46T/47T, and into the cylinder 40A. The gas flows through the piston 99, then out orifices 46B/46A in another set of adjustment discs 46/47. This flow of the gas again exerts air pressure against blades 52, causing a shaft 53 to turn, producing electricity from the rotation of the shaft 53.

In some embodiments, bearings 96/97 reduce friction as the shaft 53 rotates.

In some embodiments, a seal 95 prevents water from the body of water from entering the cylinder 40A.

Figure 5A:
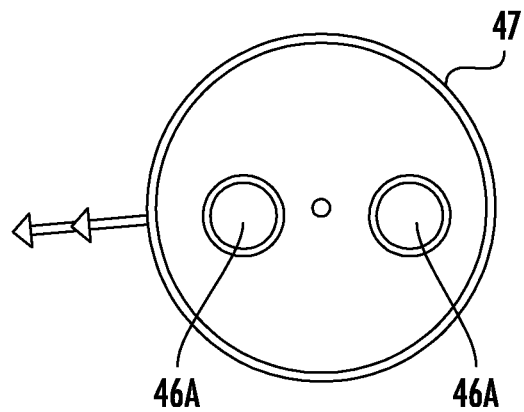
FIGS. 5A and 5B illustrate views the air pressure and flow control system.
Figure 5B:
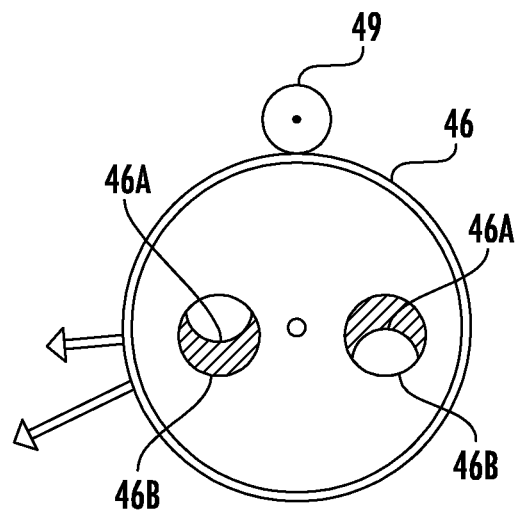

In some embodiments, one or more of the adjustment discs 46/47/46T/47T rotate as described in FIGS. 5A and 5B to control the velocity of the gas flowing through the piston 99, depending upon wave height.

It is fully anticipated to provide a cylinder 40A of ample height so as to allow full motion during all expected wave heights and tides.

Figure 4:
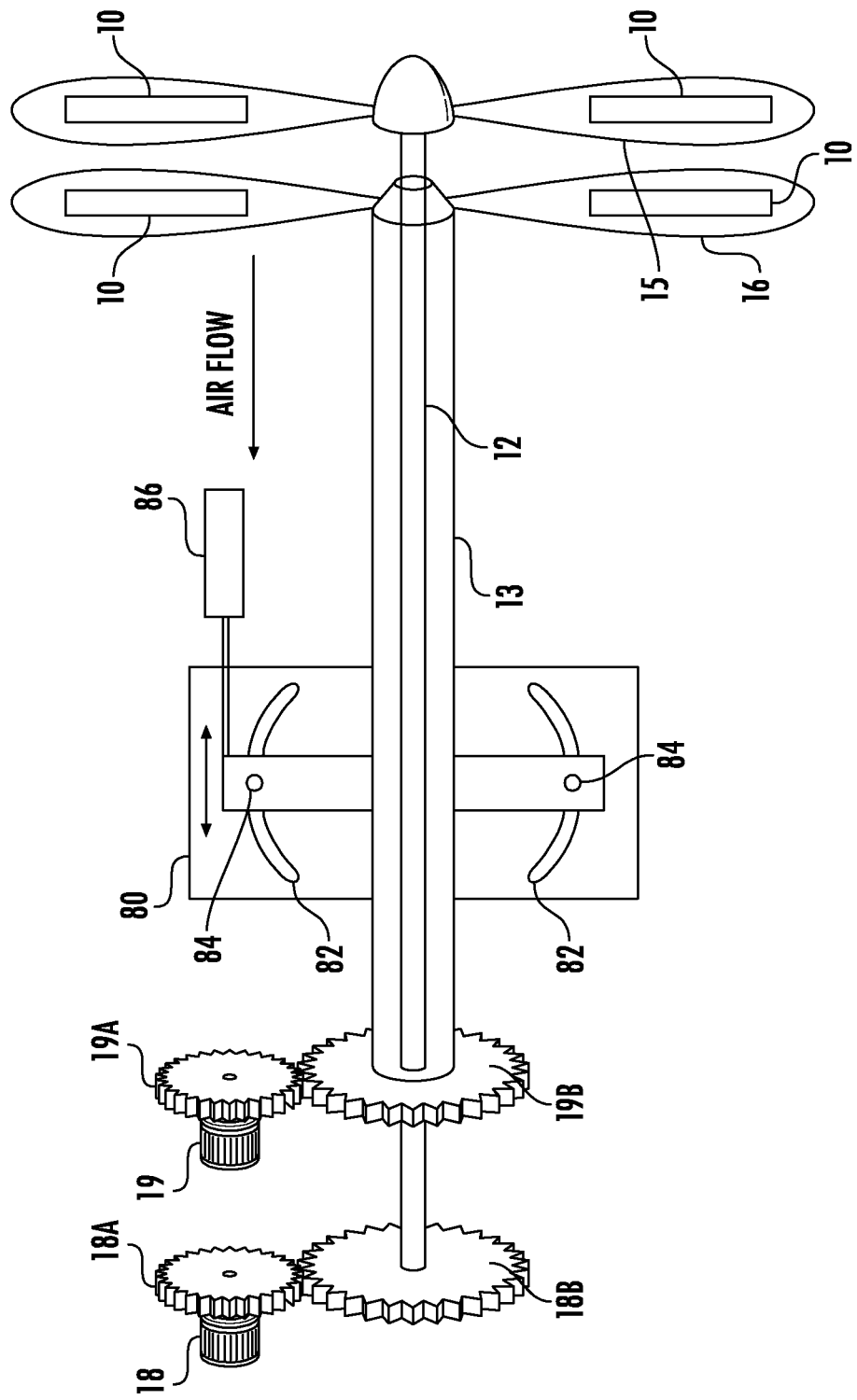
FIG. 4 illustrates a view of two turbine blades that rotate in opposite directions as wind flows.

Referring now to FIG. 4, a view of two wind turbine blades 15/16 that rotate in opposite directions as wind flows is shown. There are many reasons to rotate the wind turbine blades 15/16 in opposing directions to take fullest advantage of any wind that is present. For one, as the wind turbine blades 15/16 accelerate and decelerate, torque (rotational force) is exerted upon the wind turbine tower 5, requiring structural rigidity to not bend under this force. By configuring the wind turbine blades 15/16 to rotate in opposite directions, each wind turbine blade 15/16 thereby produces a similar, but opposing torque, thereby greatly reducing the maximum amount of torque that must be engineered into the wind turbine tower 5.

In this example, a first set 15 of wind turbine blades turn a first wind turbine shaft 12 (inner shaft) in a first rotational direction and the second set of wind turbine blades 16 turn an second wind turbine shaft 13 (outer shaft) in a second, opposite, rotational direction; the first wind turbine shaft 12 and the second wind turbine shaft 13 are coupled to the wind turbine electric generators 18/19 such that as the first wind turbine shaft 12 and the second wind turbine shaft 13 rotate, the wind turbine generators 18/19 to convert this rotational energy into electricity. Note that in some embodiments, the first wind turbine shaft 12 is coupled to a first wind turbine generator 18 through gears 18A/18B and the second wind turbine shaft 13 is coupled to a second wind turbine generator 19 through gears 19A/19B. Note that in some embodiments, the rotation of one of the shafts 12/13 is reversed, for example, by a gear and both shafts are therefore coupled to a single wind turbine generator 18.

Wind often travels substantially horizontal across the earth, but due to obstructions such as buildings, trees, hills, the wind isn't always exactly horizontal. Wind will flow at the wind turbine blades 15/16 at various angles. The maximum efficiency occurs when the wind is perpendicular to the wind turbine blades 15/16. Therefore, as shown in FIG. 4, in some embodiments, an angle of the wind turbine blades 15/16 is adjusted through the actuation of an electrically controlled device 86 (e.g. an actuator or servo motor), moving angular blade support pins 84 along a curved slot 82 in a base support plate 80, the base support plate 80 being fixed to the wind turbine tower 5, thereby adjusting an angle of the wind turbine blades 15/16 under control of a microprocessor that has knowledge of the wind angle from one or more sensors, for example.

Referring now to FIGS. 5A and 5B, views the pressure control system are shown. The adjustment discs 46/47 include a stationary adjustment disc 47 and a partially rotating adjustment disc 46. Rotation of the partially rotating adjustment disc 46 causes the orifices 46A to eclipse orifices 46B in the stationary adjustment disc 47 to adjust the overall orifice opening size and thus controls the flow rate of the air in and out of the outer structure 40, therefore, controlling a speed of rotation of the blades 52. In some embodiments, rotation of the partially rotating adjustment disc 46 is controlled by a motor 49 (e.g. a servo motor) under control of the microprocessor.

Figure 6:
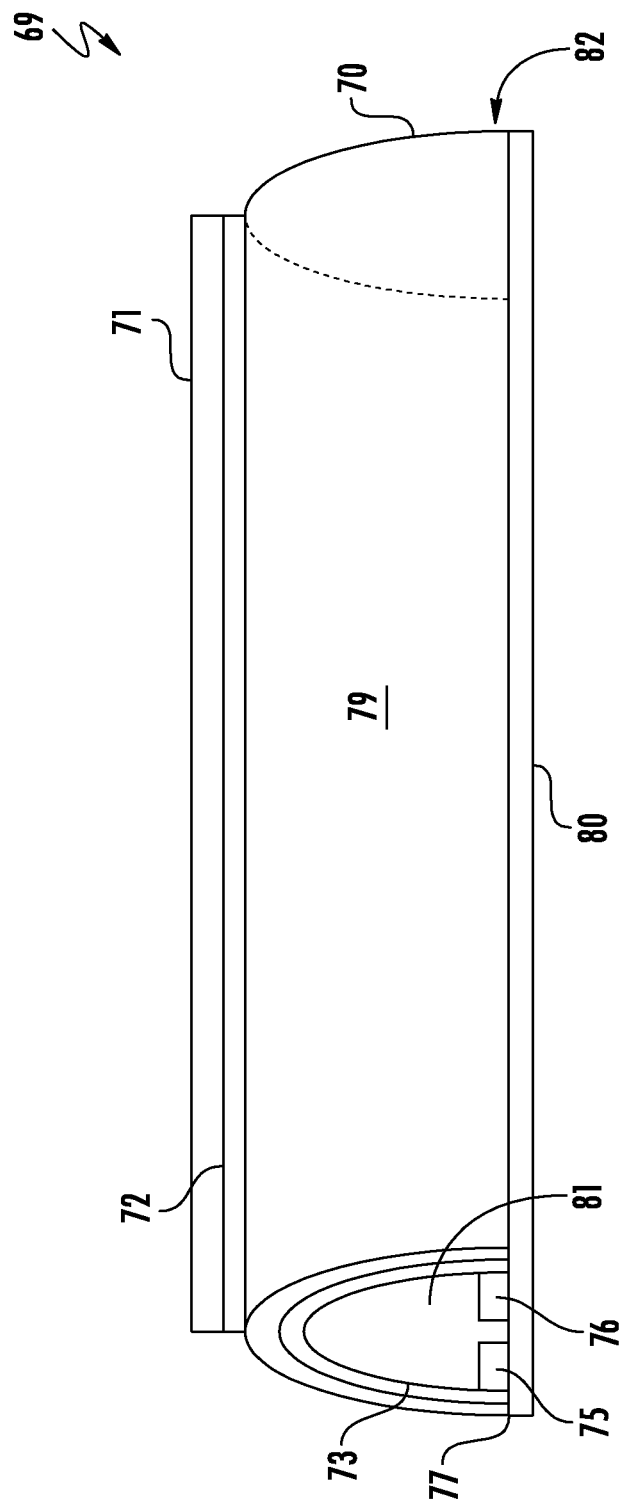
FIG. 6 illustrates a longitudinal side view of a hemi-cylindrical-shaped solar cell.
Figure 7:
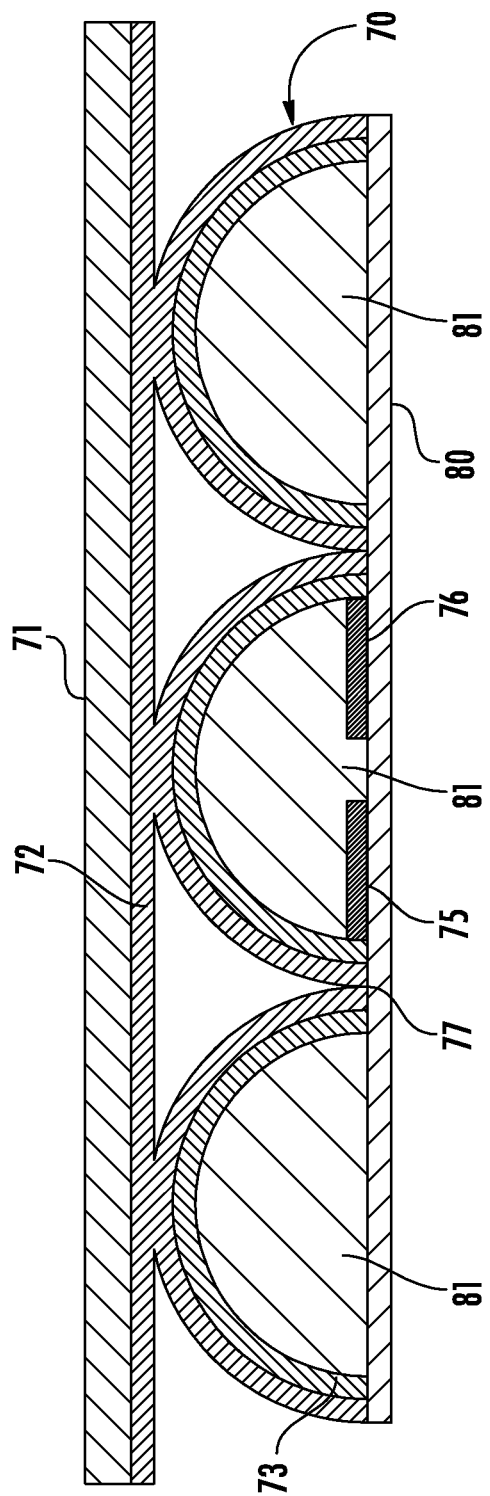
FIG. 7 illustrates a cross sectional view of a series of three dimensional hemicylinder-shaped solar cell.

Referring now to FIGS. 6 and 7, views of a solar cell 69 having a hemi-cylindrical shape are shown. Solar cells of the prior art are generally two dimensional. By making the solar cell 69 in the shape of a hemicylinder an increased surface area is realized, thereby increasing exposure to sunlight and the generation of electricity.

By making each three dimensional hemi-cylinder photovoltaic panel 70 of the solar cells 69 a hemi-cylinder instead of a two dimensional, linear, square or rectangle shape, the hemi-cylinder photovoltaic panel 70 will absorb the sun energy in multiple angles, or from a radiation of sunlight along the length of the hemi-cylinder photovoltaic panel. In addition, the surface area of the solar cells 69 having hemi-cylinder shape that are exposed to direct and indirect sunlight is increased by a factor of 1.57 (½ of 22/7). The surface area of a 20 cm by 20 cm flat solar panel is 400 cm$^2$, while hemi-cylinder within the same footprint in the shape of the hemi-cylinder photovoltaic panel 70 having a radius of 10 cm is 628.57 cm2, or more than 1.5 times the surface area of the two-dimensional solar panel. Similarly, the surface area of a two dimensional flat 20 cm by 1000 cm panel is 20,000 cm$^2$, while a hemi-cylinder photovoltaic panel 70 along the same footprint has a surface area of 31,730 cm$^2$, again 1.5 times the surface area of a flat panel, a factor of ½ of PI, or 1.57 plus 314.29 cm2 (the solar cells 69 includes an area of the two semicircular photovoltaic endcaps 81 at each end of the hemi-cylinder photovoltaic panel). Moreover, the air underneath the dome created by the hemi-cylinder photovoltaic panel 70 is available to gather heat energy and to generate electricity by converting the heat energy into pressure within the airtight enclosed space, capturing energy from pressure differences. In some embodiments, piezoelectric crystals 76 are positioned within the inside of the hemi-cylinder shape to generate electrical energy from this pressure and add to the energy created beneath the hemi-cylinder photovoltaic panel 70 of the solar cells 69.

In some embodiments, the hemisphere or hemi-cylinder photovoltaic panels 70 are protected by a glass cover 71 that is affixed to the hemi-cylinder photovoltaic panels 70 by an adhesive 72. In some embodiments, a temperature sensor 75 is mounted within the dome created by the hemi-cylinder photovoltaic panel 70.

Air or gas 79 within the dome created by the hemi-cylinder photovoltaic panel 70 is also heated by the energy from the sun and used to generated electricity, for example, by the piezoelectric crystals 76 or by harnessing the pressure differential between the air or gas 79 within the dome created by the hemi-cylinder photovoltaic panel 70 and ambient pressure.

In some embodiments, the hemisphere or hemi-cylinder photovoltaic panel 70 is supported on base support plate 80, shown as being flat, and defining an enclosed area in which the air or gas 79 is confined and, as discussed, pressurized based upon heating from the sun. In some embodiments, the hemi-cylinder photovoltaic panel 70 is provided additional structural sturdiness by a support layer 73 behind the photovoltaic layer of the hemi-cylinder photovoltaic panel 70. In some embodiments, pressure from the area between the glass cover 71 and the hemi-cylinder photovoltaic panel 70 is also harnessed to create energy.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for generating combined electric power from a platform located in a body of water, the system comprising:
   a base mounted into a floor of the body of water;
   an outer structure rises from the base forming a cavity;
   a buoyant platform that has an upward movement and a downward movement with respect to the base as a result of waves and tides in the body of water;
   a shaft is interfaced to the buoyant platform and passes into the cavity has blades attached thereto, the shaft is coupled to a generator of electricity;
   means for converting the upward movement and the downward movement into internal air flow;
   as the blades are exposed to the internal air flow, the shaft rotates and the generator outputs electricity;
   a wind turbine installed atop the buoyant platform, the wind turbine having wind turbine blades that turn a first wind turbine shaft responsive to ambient wind, the first wind turbine shaft operatively coupled to a first wind turbine generator of the electricity such that, as the turbine blades turn the first wind turbine shaft, the first wind turbine generator generates the electricity; and
   a plurality of solar cells mounted to any of the buoyant platform and the turbine blades, the plurality of solar cells generate the electricity upon exposure to light radiation.

2. The system for generating combined electric power of claim 1, wherein the turbine blades comprise a first set of the turbine blades and a second set of the turbine blades, the first set of the turbine blades configured to turn the first wind turbine shaft in a first rotational direction and the second set of the turbine blades configured to turn a second wind turbine shaft in a second, opposite, rotational direction; the second wind turbine shaft operatively coupled to a second wind turbine generator such that as the second wind turbine shaft rotates, the second wind turbine generator generates the electricity.

3. The system for generating combined electric power of claim 2, further comprising an actuator coupled to the first wind turbine shaft and the second wind turbine shaft, the actuator configured to adjust an angle of the turbine blades with respect to a horizon.

4. The system for generating combined electric power of claim 1, wherein each of the solar cells comprises a hemi-cylindrical photovoltaic cell.

5. The system for generating combined electric power of claim 4, wherein each of the hemi-cylindrical photovoltaic cell are mounted on the buoyant platform.

6. The system for generating combined electric power of claim 5, wherein an area between the hemi-cylindrical photovoltaic cell and the at least one blade is sealed and at least one piezoelectric crystal is within the area, the piezoelectric crystal generates the electricity responsive to pressure changes within the area caused by heat.

7. The system for generating combined electric power of claim 4, wherein each of the hemi-cylindrical photovoltaic cell are mounted on the turbine blades.

8. A method of producing combined electricity in a common platform mounted to a floor of a body of water, the method comprising:
   providing a buoyant platform;
   converting an upward and downward motion of the buoyant platform into a rotational motion using a plurality of blades, the blades causing the rotational motion as the blades meet air flow caused by up and down motion of the buoyant platform;
   the rotational motion turning a generator, thereby producing the electricity;
   providing a wind turbine coupled to the buoyant platform, the wind turbine and converting ambient wind energy into the electricity; and
   providing one or more solar cells mounted to the common platform, the solar cells converting light energy into the electricity.

9. The method of claim 8, further comprising the step of:
   the wind turbine having a first set of wind turbine blades and a second set of wind turbine blades and the ambient wind causing the first set of the wind turbine blades turning in a first rotational direction and the ambient wind causing the second set of the wind turbine blades turning in a second, opposite rotational direction along a common axis, the first set of the wind turbine blades and the second set of the wind turbine blades operatively coupled to a first wind turbine generator for producing the electricity.

10. The method of claim 8, wherein the solar cells comprise at least one photovoltaic cell shaped in a form of a hemi-cylinder.

11. The method of claim 10, wherein the hemi-cylinder is sealed, thereby, the hemi-cylinder converting light energy into heat and, therefore, into an internal pressure.

12. The method of claim 11, further comprising the step of using the internal pressure in generating the electricity.

13. The method of claim 8, further comprising adjusting an angle of the first set of the wind turbine blades and the second set of the wind turbine blades with respect to a horizon responsive to detecting an angle of the ambient wind with respect to the horizon.

14. An apparatus for generating electric power from a platform located in a body of water, the apparatus comprising:
a base mounted into a floor of the body of water;
a outer structure rising from the base, the outer structure having a cavity;
a piston configured to move up and down within the cavity;
a buoyant platform coupled to the piston; the buoyant platform moves upward and downward with respect to the outer structure responsive to wave motion in the body of water, thereby the buoyant platform moves the piston within the cavity as the buoyant platform moves up and down;
a shaft having blades attached thereto is interfaced with the piston, such that energy of a moving fluid within the piston is directed upon the blades to cause rotation of the blades and, hence, rotation of the shaft;
an electric generator is interfaced to the shaft, the electrical generator converts rotation of the shaft into electricity;
a wind turbine mounted on the buoyant platform, the wind turbine having wind turbine blades that are configured to turn a first wind turbine shaft in a first rotational direction responsive to ambient wind, the first wind turbine shaft operatively coupled to a first wind turbine generator of the electricity such that, as the turbine blades turn, so does the first wind turbine shaft and the first turbine generator generates the electricity; and
a plurality of solar cells mounted to any of the buoyant platform and the turbine blades, the plurality of solar cells generate the electricity upon exposure to light radiation.

15. The apparatus for generating electric power of claim 14, wherein the wind turbine has a second set of the wind turbine blades that rotate a second wind turbine shaft in a second rotational direction responsive to the ambient wind, the second rotational direction being opposite to the first rotational direction, the second wind turbine shaft passing through the first turbine shaft and the second wind turbine shaft also operatively coupled to the first wind turbine generator of the electricity such that, as the second wind turbine shaft rotates, the first wind turbine generator generates the electricity.

16. The apparatus for generating electric power of claim 15, further comprising an actuator coupled to the first turbine shaft and to the second turbine shaft, the actuator configured to adjust an angle of the turbine blades and the second set of turbine blades with respect to a horizon.

17. The apparatus for generating electric power of claim 14, wherein each of the solar cells comprises a hemi-cylindrical photovoltaic cell.

18. The apparatus for generating electric power of claim 17, wherein each of the hemi-cylindrical photovoltaic cell are mounted on the turbine blades.

* * * * *